(12) United States Patent
Schauf

(10) Patent No.: US 9,216,129 B2
(45) Date of Patent: Dec. 22, 2015

(54) CONTAINER FOR CREMATED REMAINS

(71) Applicant: Gabriel Schauf, Hammond, WI (US)

(72) Inventor: Gabriel Schauf, Hammond, WI (US)

( * ) Notice: Subject to any disclaimer, the term of this patent is extended or adjusted under 35 U.S.C. 154(b) by 0 days.

(21) Appl. No.: 14/301,290

(22) Filed: Jun. 10, 2014

(65) Prior Publication Data

US 2014/0359982 A1    Dec. 11, 2014

Related U.S. Application Data

(60) Provisional application No. 61/833,811, filed on Jun. 11, 2013.

(51) Int. Cl.
*A61G 17/08* (2006.01)
*B62J 9/00* (2006.01)
*A61G 17/007* (2006.01)

(52) U.S. Cl.
CPC ............... *A61G 17/08* (2013.01); *B62J 9/001* (2013.01); *A61G 17/0076* (2013.01); *A61G 2220/18* (2013.01); *Y10T 29/49286* (2015.01); *Y10T 29/49947* (2015.01)

(58) Field of Classification Search
CPC .............. A61G 17/08; A61G 17/0076; A61G 2220/18; E04H 13/008; Y10T 29/49826; Y10T 29/49947; Y10T 26/49826; B62K 11/04; F02B 61/02; B62J 9/001
USPC ................... 27/1, 35; D99/5; 29/428, 525.01; 180/219, 230
See application file for complete search history.

(56) References Cited

U.S. PATENT DOCUMENTS

| | | | |
|---|---|---|---|
| D446,477 S | 8/2001 | Netz | |
| 6,754,940 B1 * | 6/2004 | Boots | 27/27 |
| D509,638 S * | 9/2005 | Moritz et al. | D99/5 |
| D510,785 S * | 10/2005 | King | D99/30 |
| D511,604 S * | 11/2005 | Moritz et al. | D99/5 |
| 6,988,299 B1 * | 1/2006 | Barrette et al. | 27/1 |
| 7,178,209 B1 * | 2/2007 | Radziewicz | 27/1 |
| 2005/0194200 A1 * | 9/2005 | Larson | 180/375 |

* cited by examiner

*Primary Examiner* — William Miller
(74) *Attorney, Agent, or Firm* — Faegre Baker Daniels LLP

(57) ABSTRACT

A container for containing cremated remains is provided herein. The container provided herein is suitable for use as a clutch or point cover for a motorcycle.

19 Claims, 9 Drawing Sheets

CONTAINER FOR CREMATED REMAINS

CROSS-REFERENCE TO RELATED APPLICATIONS

This application claims the benefit of U.S. Provisional Patent Application Ser. No. 61/833,811, filed on Jun. 11, 2013, which is incorporated herein by reference in its entirety for all purposes.

TECHNICAL FIELD

The present disclosure relates to containers for cremated remains.

BACKGROUND

Carrying, transporting, and/or displaying cremated remains, for example cremated remains of a loved one, can be challenging. Current solutions do not accommodate in any unique or creative way the carrying, transport, and/or display of cremated remains, for example for motorcycle enthusiasts.

SUMMARY

Provided herein is a container for containing cremated remains configured for attachment to a motorcycle as a cover component. In some embodiments, the container of includes a cover having a front surface and a back portion, the back portion including a container section, a sealing section, a back plate attachment region, and an attachment region, the attachment region configured to attach the container to a motorcycle such that the container covers an access point to a performance part of the motorcycle; and a back plate configured to attach to the back plate attachment region to form an enclosed cavity when the back plate is attached to the back plate attachment region, the cavity suitable for containing cremated remains.

In some embodiments, the container includes a back plate having a back surface and a front portion, the front portion including a container section, a sealing section, a cover attachment region, and an attachment region, the attachment region configured to attach the container to a motorcycle such that the container covers the access point; and a cover configured to attach to the cover attachment region to form an enclosed cavity when the cover is attached to the cover attachment region, the cavity suitable for containing cremated remains.

In some embodiments, the container includes a back plate having a back surface and a front portion, the front portion including a container section, a sealing section, and a cover attachment region; and a cover comprising an attachment region, the attachment region configured to attach the container to a motorcycle such that the container covers the access point, the cover configured to attach to the cover attachment region to form an enclosed cavity when the cover is attached to the cover attachment region, the cavity suitable for containing cremated remains.

In some embodiments, the container can have a sealing section that includes a groove and gasket.

In some embodiments, at least one of a cover and a back plate of the container comprises a metal.

In some embodiments, the container can include an attachment region that comprises a fastener receptacle.

In some embodiments, the container is configured as a clutch cover or a points cover.

In some embodiments, the container is configured to attach to a display surface, such as a plaque.

Also provided is a method of attaching to a motorcycle a container such that the container covers an access point to a performance part on the motorcycle, where the container includes a back plate adjacent the access point and a cover covering the back plate to form an enclosed cavity suitable for containing cremated remains.

In some embodiments of a method provided herein, the cover includes a front surface and a back portion, the back portion including a container section, a sealing section, a back plate attachment region, and an attachment region, the attachment region configured to attach the container to the motorcycle; and the back plate is configured to attach to the back plate attachment region to form the enclosed cavity between the container section and the back plate.

In some embodiments of a method provided herein, the back plate includes a back surface facing the access point and a front portion, the front portion including a container section, a sealing section, a cover attachment region, and an attachment region, the attachment region configured to attach the container to the motorcycle; and the cover is configured to attach to the cover attachment region to form the enclosed cavity between the container section and the cover.

In some embodiments of a method provided herein, the back plate includes a back surface facing the access point and a front portion, the front portion including a container section, a sealing section, and a cover attachment region; and the cover including an attachment region, the attachment region configured to attach the container to the motorcycle, the cover configured to attach to the cover attachment region to form the enclosed cavity between the container section and the cover.

In some embodiments, the method includes hermetically sealing the enclosed cavity.

In some embodiments, the method includes removing a cover from the access point of the motorcycle before attaching the container to the motorcycle.

In some embodiments, the method includes attaching the container to the motorcycle with at least one bolt that was used to attach the cover to the access point of motorcycle. In some embodiments, the method includes attaching the container to the motorcycle with the same number and size of bolts that were used to attach the cover to the access point of motorcycle.

In some embodiments, the method includes opening the container, inserting the cremated remains into the container, and sealing the container to form the enclosed cavity.

In some embodiments of a method provided herein, the performance part is a clutch.

Also provided is a container for use with a motorized vehicle, where the motorized vehicle has a plurality of threaded fastener receptacles and the container includes an attachment region having holes corresponding in size and placement to the plurality of threaded fastener receptacles of the motorized vehicle, and an enclosed cavity configured to be hermetically sealed, the enclosed cavity adapted to receive cremated human remains.

In some embodiments, the container includes the cremated human remains within the enclosed cavity.

In some embodiments, the motorized vehicle is a motorcycle, and the plurality of threaded fastener receptacles are threaded bolt holes for a clutch cover of the motorcycle.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Disclosed herein are embodiments of a container for cremated remains. A container for cremated remains can be configured as a cover component for a motorcycle. A cover component can include a component that covers an access point to a performance part of a motorcycle, such as a transmission part, a motor part, an exhaust system part, an electrical system part, or a fuel system part. A cover component can include, without limitation a clutch cover (also referred to as a derby cover), a points or ignition parts cover, an air cleaner cover, an inspection cover, a fuel lid, or the like. In some embodiments, a container for cremated remains can be configured to be affixed to a surface, such as a display board or plaque, rather than to a motorcycle.

Figure 1:
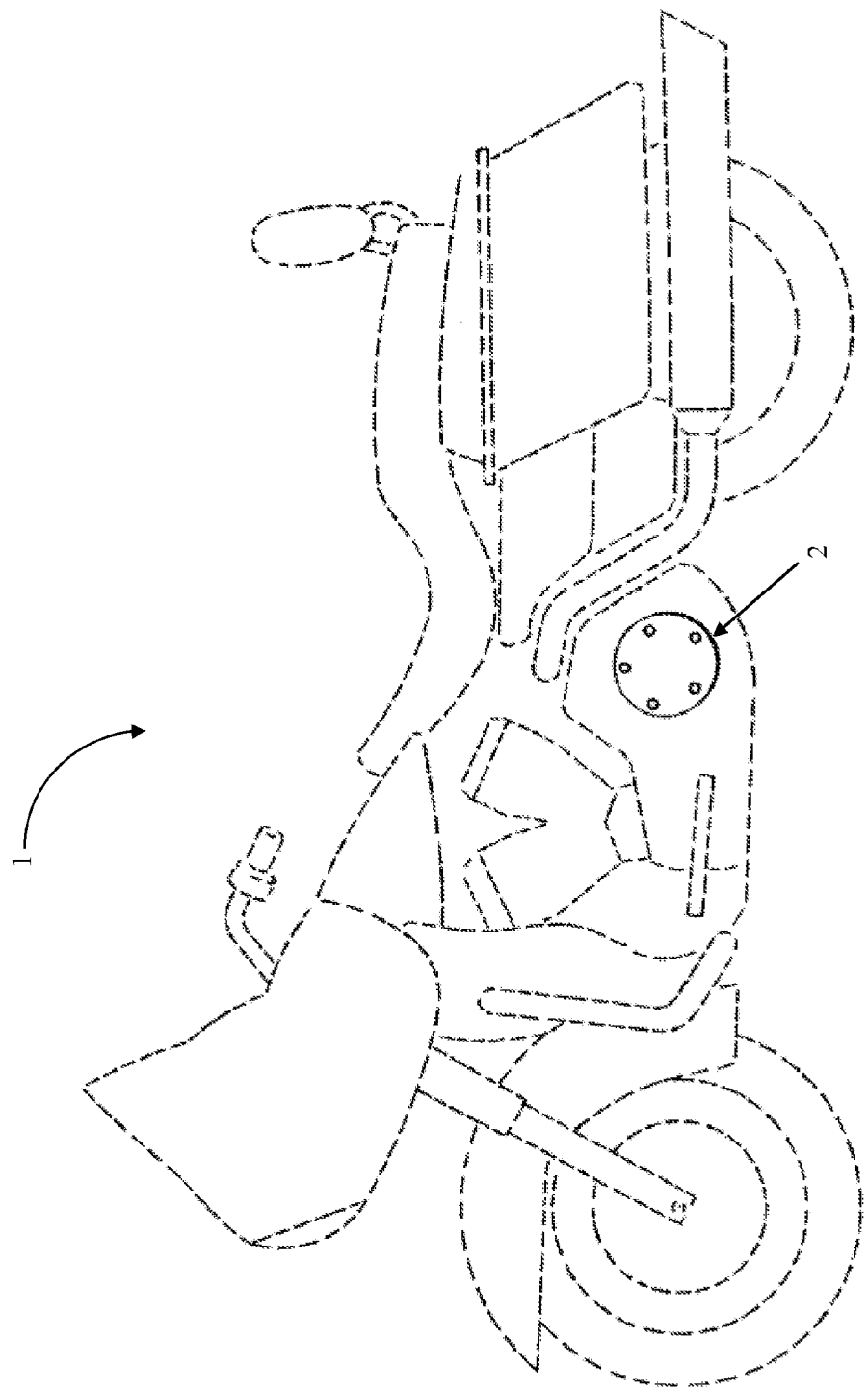
FIG. 1 shows a side view of a motorcycle showing placement of a clutch cover.

FIG. 1 is a side view of a motorcycle 1 that illustrates size and placement of an example attached clutch cover 2. A clutch cover typically protects the clutch of a motorcycle from dust and other contaminants. It is to be understood that different makes and models of motorcycles can have different sizes and shapes of clutch covers, as well as different attachment locations for a clutch cover. Although the following embodiments describe a container for cremated remains that is configured to be a motorcycle clutch cover, it is to be understood that a container for cremated remains can be similarly configured as a different type of cover component.

Figure 2:
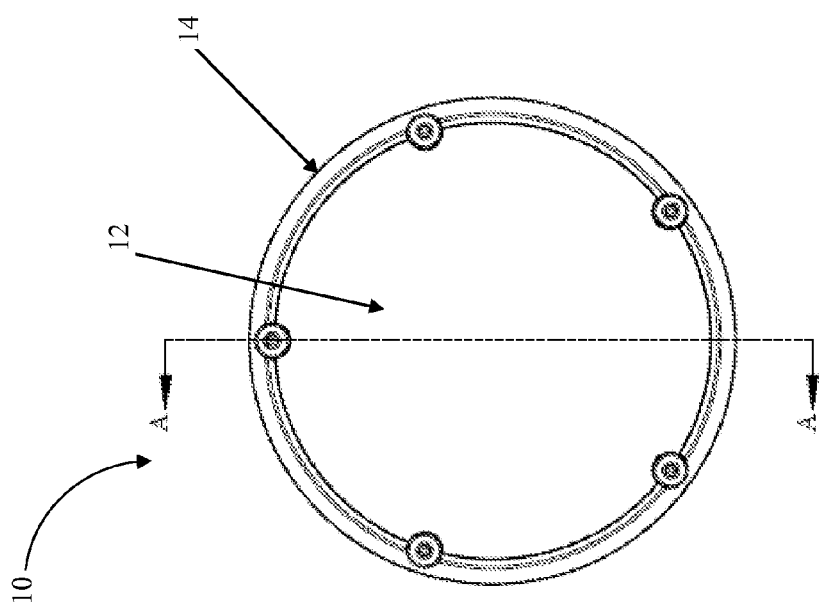
FIG. 2 shows a front view of a container for cremated remains, according to an embodiment.
Figure 3:
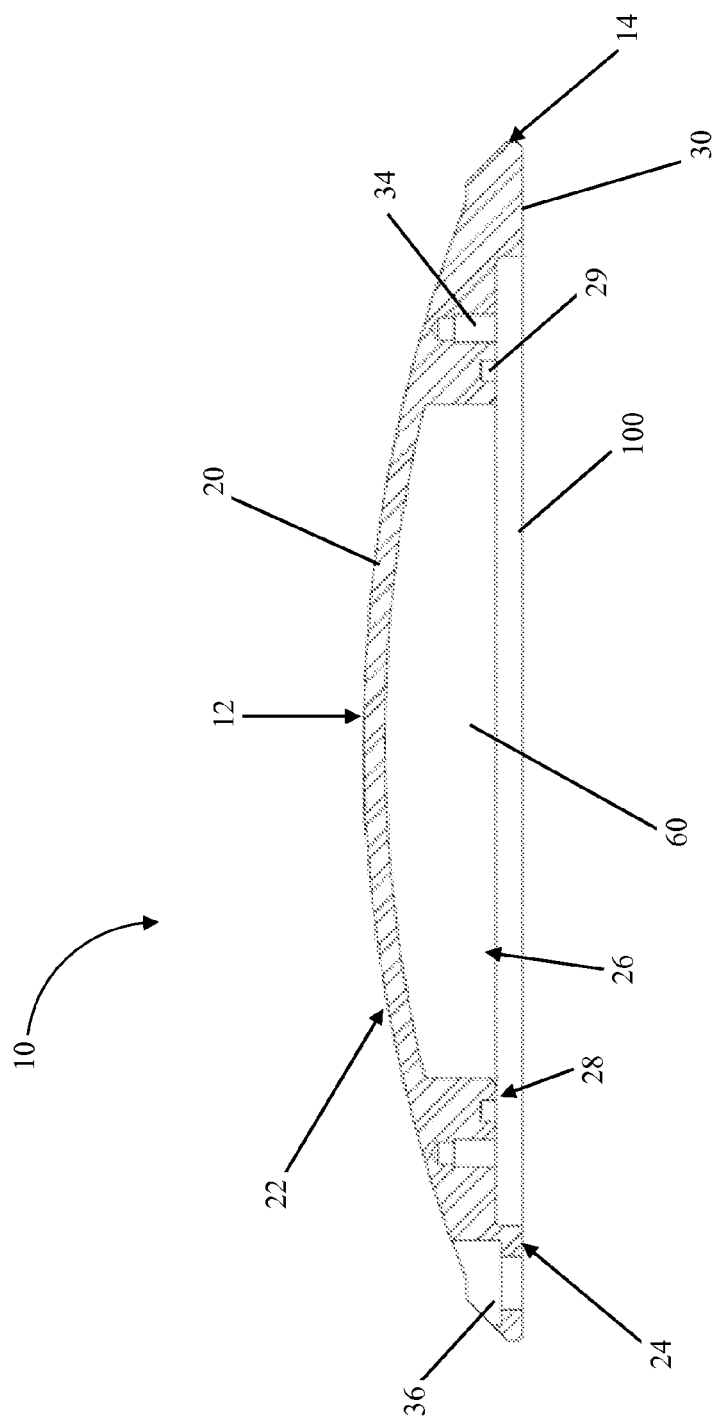
FIG. 3 shows a section through A-A of the container of FIG. 2.

FIG. 2 is a front view of a container 10 for cremated remains having a central portion 12 and an edge 14, according to some embodiments of the present invention. FIG. 3 shows a cross section of the container 10 of FIG. 1 along axis A-A shown in FIG. 2. Container 10 includes a cover 20 and a back plate 100. Cover 20 and back plate 100 interconnect with one another to form an enclosed cavity 60. Cover 20 and back plate 100 can comprise any suitable material such as a metal, a polymer, glass, ceramic, or a combination thereof. Cover 20 and back plate 100 can be made from the same or different materials.

Cover 20 has a front surface 22 and a back portion 24. When cover 20 is attached to a motorcycle as a clutch cover, front surface 22 faces away from the motorcycle and back portion 24 faces toward the clutch of the motorcycle. In the embodiment illustrated in FIG. 4, back portion 24 of cover 20 defines a container section 26, a sealing section 28, a back plate attachment region 30, and an attachment region 32.

Container section 26 is formed in back portion 24 of cover 20 as a hollow area at or near the center of back portion 24 in which cremated remains can be deposited. Container section 26 can be any suitable shape that forms a hollow area. In some embodiments, container section 26 is domed, box-shaped, cone-shaped, or pyramidal. In some embodiments, container section 26 is a more complex shape, such as a hollow emblem, an animal, or a skull. In some embodiments, the shape of container section 26 can be apparent on front surface 22 of cover 20. In some embodiments, the front surface 22 can include any desired design, shape, pattern, and/or surface ornamentation.

Figure 4:
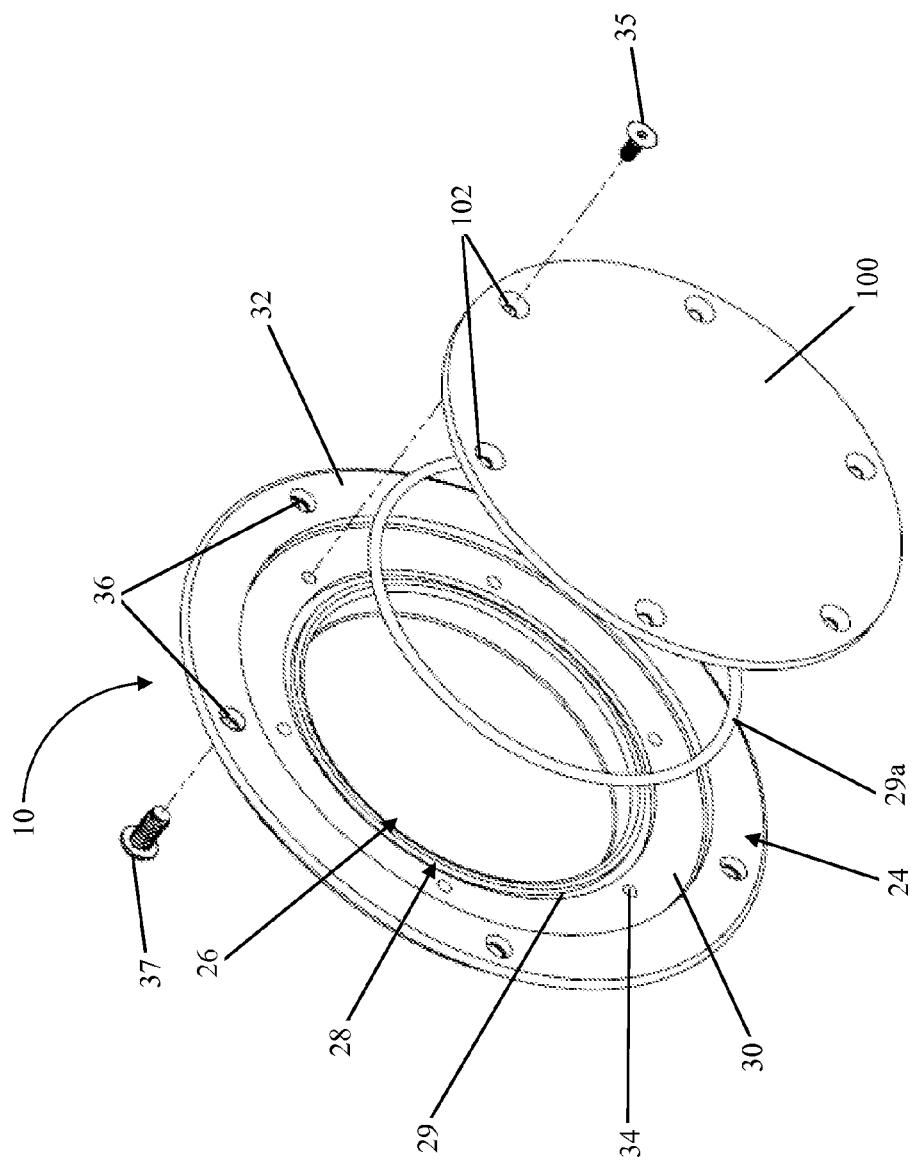
FIG. 4 shows an exploded back perspective view of a container for cremated remains, according to an embodiment.

As shown in FIG. 4, in some embodiments, a sealing section 28 can be formed adjacent to container section 26 and nearer to edge 14 relative to container section 26. Sealing section 28 is configured to prevent cremated remains in container section 26 from escaping enclosed cavity 60 when cover 20 and back plate 100 are connected. A seal can be formed between cover 20 and back plate 100 via sealing section 28 using any appropriate sealing technology. In some embodiments, sealing section 28 includes a groove 29 formed in back portion 24 surrounding the perimeter of container section 26, the groove 29 being configured to receive a gasket 29a. In other embodiments, a seal can be formed between cover 20 and back plate 100 using a tight fit between sealing section 28 and back cover 100 and/or the addition of a sealant, such as caulk. In some embodiments, a seal formed between cover 20 and back plate 100 can be a hermetic seal.

Enclosed cavity 60 can have a volume suitable for containing cremated remains. For example, enclosed cavity 60 can have a volume that is at least 3 cubic centimeters. In some embodiments, enclosed cavity 60 can have a volume of from about 3 cubic centimeters to about 500 cubic centimeters (e.g., from 3 $cm^3$ to 300 $cm^3$, from 50 $cm^3$ to 100 $cm^3$, from 200 $cm^3$ to 400 $cm^3$, from 100 $cm^3$ to 300 $cm^3$, from 10 $cm^3$ to 80 $cm^3$, and the like).

The back plate attachment region 30 is formed in the back portion 24 of cover 20 adjacent to sealing section 28 and nearer edge 14 relative to sealing section 28. Back plate attachment region 30 is configured to include one or more component, such as a fastener receptacle 34 (e.g., a threaded fastener receptacle) for receiving a screw or bolt 35 or a clip component (not shown), for attaching back plate 100 to cover 20. In some embodiments, back plate 100 can be removably attached to cover 20 in order to allow addition or removal of cremated remains, for example on more than one occasion. In other embodiments, back plate 100 can be permanently affixed to cover 20 following the addition of cremated remains. In embodiments where back plate 100 is permanently affixed to cover 20, a fastener receptacle 34 or clip may or may not be necessary, and back plate 100 can be attached to cover 20 using, for example, an adhesive or by welding the back plate 100 and cover 20 together. In some embodiments, the back plate attachment region 30 can be recessed in back section 24 relative to attachment region 32 such that when back plate 100 is attached to cover 20, it does not extend beyond attachment region 32.

Attachment region 32 is formed in the back portion 24 of cover 20 adjacent to back plate attachment region 30 and nearer edge 14 relative to back plate attachment region 30. Attachment region 32 is configured to include one or more components that can be used to attach container 10 to a motorcycle or other desired surface. In some embodiments, attachment region 32 has one or more fastener receptacles 36 (e.g., a threaded fastener receptacle) for receiving a screw 37 or bolt (not shown). The number, size and placement of receptacles 36 can be adjusted as appropriate for a desired make and/or model of motorcycle. In another embodiment, attachment region 32 includes a clip component (not shown) for attaching container 10 to a motorcycle or other desired surface. Attachment region 32 is can be configured such that it interacts with the clutch casing of a motorcycle when container 10 is used as a clutch cover in order to reduce dust or other materials from entering the clutch of the motorcycle. In some embodiments (not shown), attachment region 32 can be on back plate 100 rather than cover 20.

As shown in FIG. 4, back plate 100 is configured to attach to back plate attachment region 30. In some embodiments, back plate 100 is substantially flat as shown in FIG. 4. However, in some embodiments of the present invention, back plate 100 can be configured in any manner which serves to attach to cover 20 to form enclosed cavity 60 and retain cremated remains in enclosed cavity 60 without interfering with the ability of container 10 to be attached to a motorcycle or other desired surface. Back plate 100 can include one or more components, such as a fastener receptacle 102 (e.g., a threaded fastener receptacle) or clip component (not shown), that is complementary to a component on attachment region 32 for attaching back plate 100 to cover 20.

Figure 5:
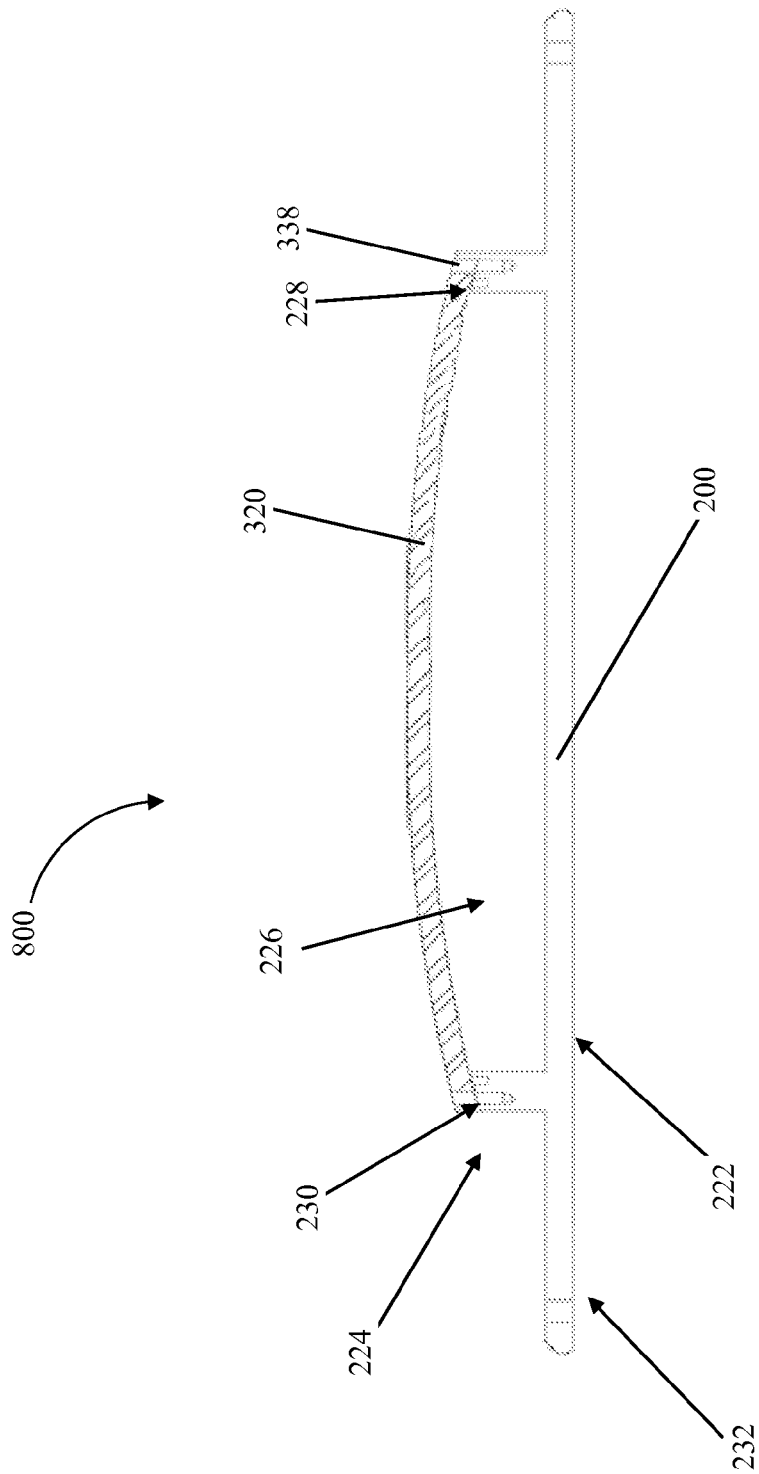
FIG. 5 shows a section view of a container for cremated remains, according to an embodiment.

In some embodiments, as shown in FIG. 5, container 800 includes a back plate 200 that is configured such that it includes a back surface 222 and a front portion 224. Front portion 224 of back plate 200 can be analogous to back portion 24 of cover 20, and can include a container section 226, a sealing section 228, a cover attachment region 230, and an attachment region 232 for attaching container 800 to a motorcycle or other desired surface. In an embodiment where back plate 200 includes a front portion, as shown in FIG. 5, cover 320 can be generally flat and may include features such as one or more fastener components, such as receptacle 338 (e.g., a threaded fastener receptacle), to facilitate attachment of cover 320 to back plate 200.

Figure 6:
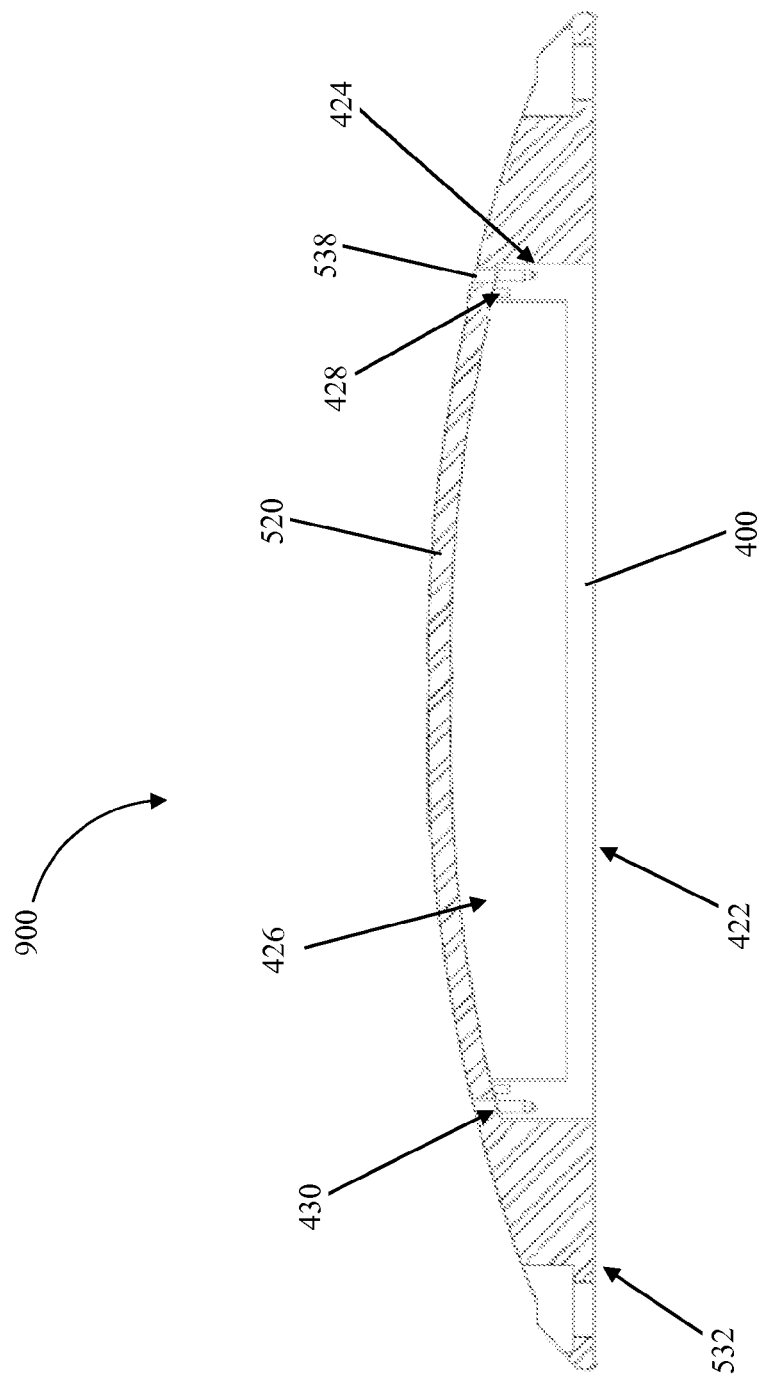
FIG. 6 shows a section view of a container for cremated remains, according to an embodiment.

In some embodiments, as shown in FIG. 6, container 900 includes a back plate 400 that is configured such that it includes a back surface 422 and a front portion 424. Front portion 424 of back plate 400 can be similar to front portion 224 of back plate 200, and can include a container section 426, a sealing section 428, and a cover attachment region 230. As shown in FIG. 6, cover 520 can be generally flat and may include features such as one or more fastener receptacles 538 (e.g., a threaded fastener receptacle) to facilitate attachment of cover 520 to back plate 400, and can include attachment region 532 and one or more attachment components, such as fastener receptacles 538 or clips (not shown) for attaching container 900 to a motorcycle or other desired surface.

Embodiments of containers may include any additional appropriate features, such as a waterproof liner for an enclosed cavity, a plaque for display, and/or washers for use with screws or bolts. Embodiments of containers can have any suitable dimensions to accommodate affixing a container for cremated remains to a desired motorcycle, or to provide a desired aesthetic appearance.

Figure 7:
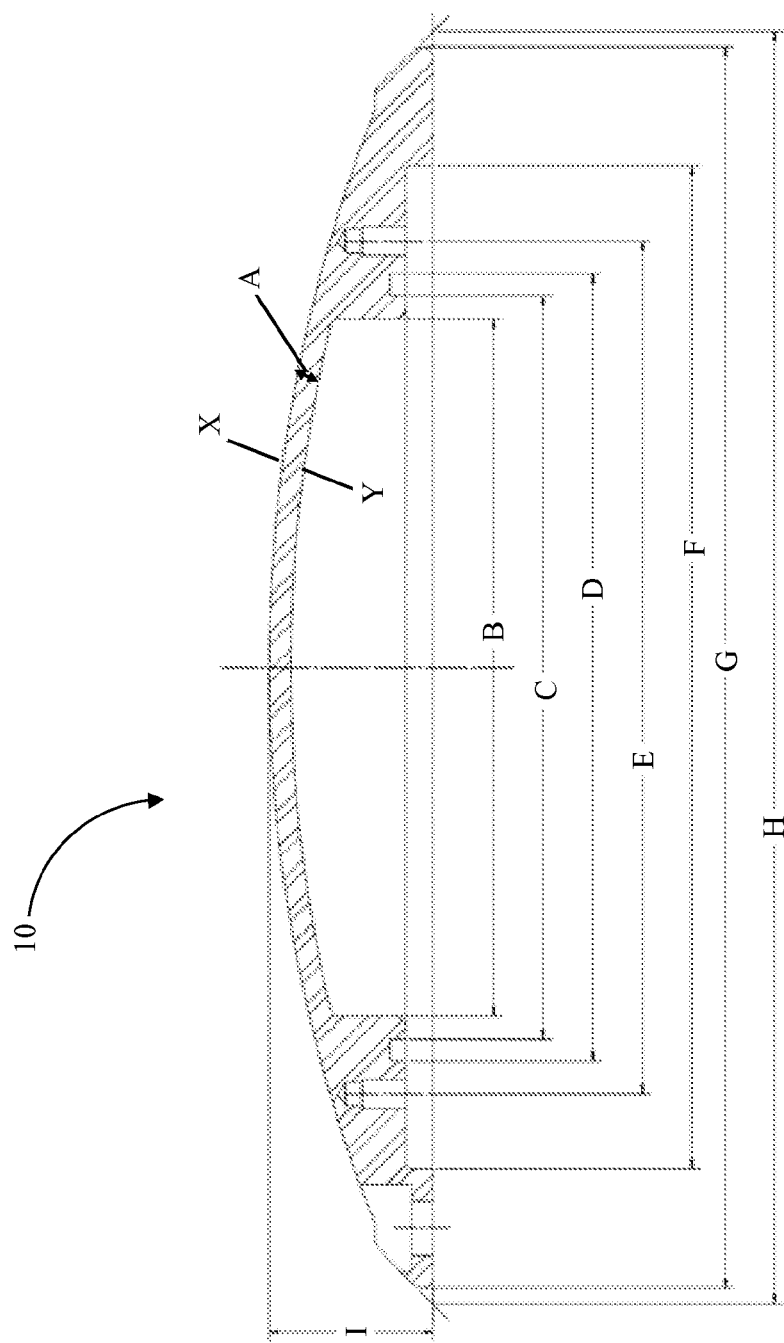
FIG. 7 shows a section view of a container for cremated remains, according to an embodiment.
Figure 8:
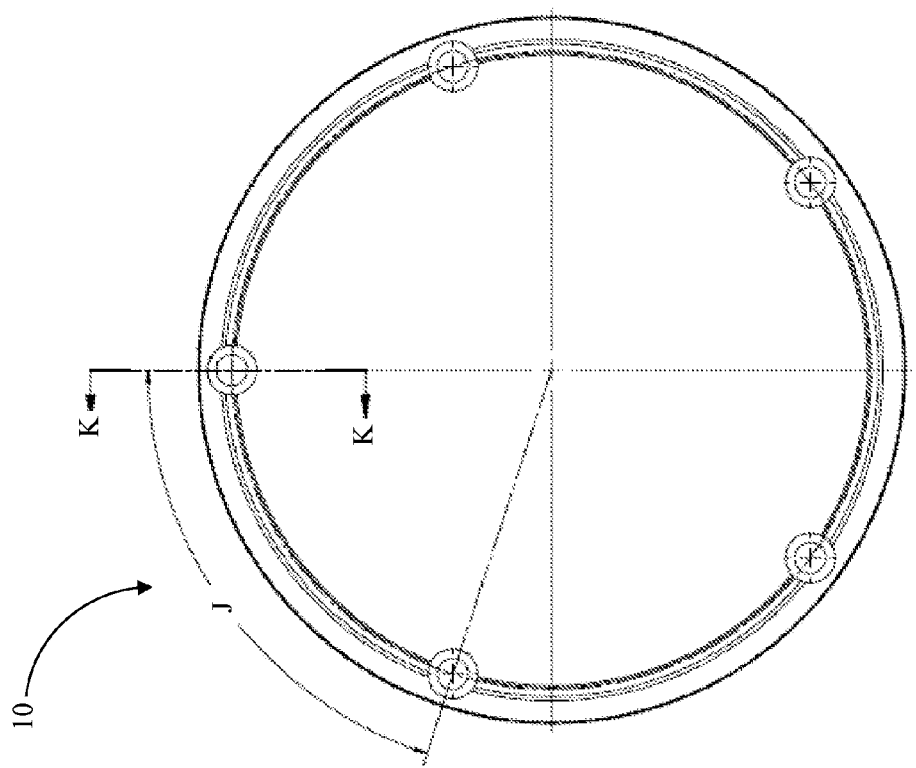
FIG. 8 shows a front view of a container for cremated remains, according to the embodiment in FIG. 7.
Figure 9:
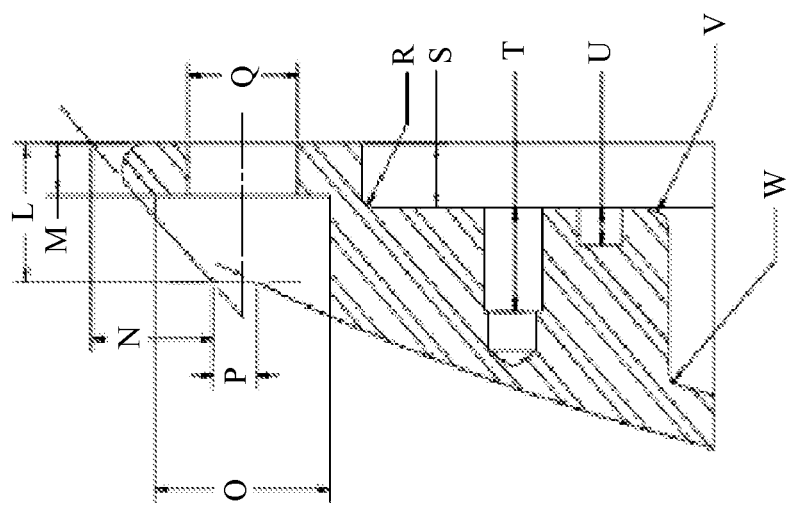
FIG. 9 shows a section through K-K of the container according to FIG. 8.

FIGS. 7-9 show an example of a container for cremated remains suitable for use as a clutch cover on a Harley Davidson 1999 model year and later Evolution 1340 and Twin Cam-equipped model motorcycle. As shown in FIG. 7-9, a container for Harley Davidson 1999 model year and later Evolution 1340 and Twin Cam-equipped model clutch cover can have measurements as shown in Table 1.

| Reference | Measurement (inches, except where otherwise indicated) |
|---|---|
| A | 0.125 |
| B | 3.99 |
| C | 4.25 |
| D | 4.5 |
| E | 4.875 |
| F | 5.74 |
| G | 7.094 |
| H | 7.271 |
| I | 0.938 |
| J | 72° |
| L | 0.335 |
| M | 0.125 |
| N | 0.343 |
| O | 0.5 |
| P | 0.126 |
| Q | 0.313 |
| R | Radius of 0.03 |
| S | 0.155 |
| T | 0.25 |
| U | 0.09 |
| V | Radius of 0.06 |
| W | Radius of 0.03 |

Embodiments of the present invention include methods for displaying a container for cremated remains, for example for displaying a container for cremated remains as described herein. In one embodiment, a container is attached as a clutch cover to a motorcycle. In some embodiments, a clutch cover is removed from the motorcycle and replaced with a container for cremated remains. In some embodiments the container can be attached using the same fasteners (e.g., bolts) and/or number of fasteners as the clutch cover it replaced.

In another embodiment, a container is attached to a display surface, such as a plaque. In some embodiments, the methods further include depositing cremated remains inside the container prior to or after attachment to a motorcycle or display surface. In some embodiments, a container is sealed (e.g., hermetically sealed) to prevent the loss of cremated remains from an enclosed cavity formed in the container.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

I claim:

1. A container for containing cremated remains configured for attachment to a motorcycle as a cover component, the container comprising:
a cover having a front surface and a back portion, the back portion including a container section, a sealing section, a back plate attachment region, and an attachment region, the attachment region configured to attach the container to the motorcycle such that the container covers an access point to a performance part of the motorcycle; and
a back plate configured to attach to the back plate attachment region to form an enclosed cavity when the back plate is attached to the back plate attachment region, the cavity suitable for containing the cremated remains.

2. A container for containing cremated remains configured for attachment to a motorcycle as a cover component, the container comprising:
a back plate having a back surface and a front portion, the front portion including a container section, a sealing section, a cover attachment region, and an attachment region, the attachment region configured to attach the container to the motorcycle such that the container covers an access point to a performance part of the motorcycle; and a cover configured to attach to the cover attachment region to form an enclosed cavity when the cover is attached to the cover attachment region, the cavity suitable for containing the cremated remains.

3. A container for containing cremated remains configured for attachment to a motorcycle as a cover component, the container comprising:

a back plate having a back surface and a front portion, the front portion including a container section, a sealing section, and a cover attachment region; and a cover comprising an attachment region, the attachment region configured to attach the container to the motorcycle such that the container covers an access point to a performance part of the motorcycle, the cover configured to attach to the cover attachment region to form an enclosed cavity when the cover is attached to the cover attachment region, the cavity suitable for containing the cremated remains.

4. The container of claim 1, wherein the sealing section includes a groove and gasket.

5. The container of claim 1, wherein at least one of the cover and the back plate comprises a metal.

6. The container of claim 1, wherein the attachment region comprises a fastener receptacle.

7. The container of claim 1, wherein the container is configured as a clutch cover or a points cover.

8. A method comprising attaching to a motorcycle a container for containing cremated remains such that the container covers an access point to a performance part on the motorcycle, the container comprising a back plate adjacent the access point and a cover covering the back plate to form an enclosed cavity suitable for containing the cremated remains.

9. The method of claim 8, wherein the cover includes a front surface and a back portion, the back portion including a container section, a sealing section, a back plate attachment region, and an attachment region, the attachment region configured to attach the container to the motorcycle; and the back plate is configured to attach to the back plate attachment region to form the enclosed cavity between the container section and the back plate.

10. The method of claim 8, wherein the back plate includes a back surface facing the access point and a front portion, the front portion including a container section, a sealing section, a cover attachment region, and an attachment region, the attachment region configured to attach the container to the motorcycle; and the cover is configured to attach to the cover attachment region to form the enclosed cavity between the container section and the cover.

11. The method of claim 8, wherein the back plate includes a back surface facing the access point and a front portion, the front portion including a container section, a sealing section, and a cover attachment region; and the cover including an attachment region, the attachment region configured to attach the container to the motorcycle, the cover configured to attach to the cover attachment region to form the enclosed cavity between the container section and the cover.

12. The method of claim 8, further comprising hermetically sealing the enclosed cavity.

13. The method of claim 8, further comprising removing a protective cover from the access point of the motorcycle before attaching the container to the motorcycle.

14. The method of claim 13, further comprising attaching the container to the motorcycle with at least one bolt that was used to attach the protective cover to the access point of motorcycle.

15. The method of claim 13, further comprising attaching the container to the motorcycle with the same number and size of bolts that were used to attach the protective cover to the access point of motorcycle.

16. The method of claim 8, further comprising opening the container, inserting the cremated remains into the container, and sealing the container to form the enclosed cavity.

17. The method of claim 8, wherein the performance part is a clutch.

18. A container for containing cremated human remains for use with a motorized vehicle, the motorized vehicle having a plurality of threaded fastener receptacles, the container comprising:

an attachment region having holes corresponding in size and placement to the plurality of threaded fastener receptacles of the motorized vehicle, and an enclosed cavity configured to be hermetically sealed, the enclosed cavity adapted to receive the cremated human remains, wherein the motorized vehicle is a motorcycle, and wherein the plurality of threaded fastener receptacles are threaded bolt holes for a clutch cover of the motorcycle.

19. The container of claim 18, further comprising the cremated human remains within the enclosed cavity.

* * * * *